(12) United States Patent
Carmel et al.

(10) Patent No.: US 7,761,524 B2
(45) Date of Patent: Jul. 20, 2010

(54) AUTOMATICALLY GENERATED SUBJECT RECOMMENDATIONS FOR EMAIL MESSAGES BASED ON EMAIL MESSAGE CONTENT

(75) Inventors: David Carmel, Haifa (IL); Shai Erera, Kiryat Ata (IL); Itzhack Goldberg, Hadera (IL); Boaz Mizrachi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 11/841,075

(22) Filed: Aug. 20, 2007

(65) Prior Publication Data
US 2009/0055481 A1 Feb. 26, 2009

(51) Int. Cl.
G06F 15/16 (2006.01)
(52) U.S. Cl. .................................... 709/206
(58) Field of Classification Search ............... 709/206
See application file for complete search history.

(56) References Cited

U.S. PATENT DOCUMENTS

| 2005/0144245 | A1 | 6/2005 | Lowe | |
| 2005/0262214 | A1* | 11/2005 | Bagga et al. | 709/207 |
| 2006/0241944 | A1* | 10/2006 | Potter et al. | 704/254 |
| 2006/0253537 | A1 | 11/2006 | Thomas | |

FOREIGN PATENT DOCUMENTS

JP 2004288111 A * 10/2004
WO WO 2005109265 A1 * 11/2005

OTHER PUBLICATIONS

Cselle, G., et al., "BuzzTrack: Topic Detection and Tracking in Email", Int'l. Conf. on Intelligent User Interfaces '07, pp. 190-197, Jan. 28-31, 2007.

* cited by examiner

*Primary Examiner*—Joon H Hwang
*Assistant Examiner*—Mark Pfizenmayer
(74) *Attorney, Agent, or Firm*—Patents On Demand, P.A.; Brian K. Buchheit

(57) ABSTRACT

The present invention discloses an email application that includes a subject evaluation engine, which is able to automatically generate a subject heading suggestion for an email message based upon content contained in the email message. The subject evaluation engine can also compare a pre-existing subject heading of the email message against content contained in the email message. User selectable interface elements can be included in the email application for invoking the suggestion and comparison functions of the subject evaluation engine. Further, the subject evaluation can automatically be initiated before an email message is sent, can be used to notify a user when the message's subject is inconsistent with the message's content, and can suggest one or more replacement subject headings for the current heading.

14 Claims, 2 Drawing Sheets

AUTOMATICALLY GENERATED SUBJECT RECOMMENDATIONS FOR EMAIL MESSAGES BASED ON EMAIL MESSAGE CONTENT

BACKGROUND

1. Field of the Invention

The present invention relates to electronic mail, and more particularly, to automatically generated subject recommendations for email messages based on email message content.

2. Description of the Related Art

Email has become an integral part of business and personal life, becoming a primary means of communication for many. Users who rely on email are often inundated with sending and reading emails. An often overlooked but important part of an email is the subject heading. The subject heading is frequently used as a criteria for sorting and managing emails. Users who rely heavily on email frequently neglect writing appropriate subject headings for their emails in an effort to save time. This neglect can result in vague and/or misleading subject headings. Other times the subject heading is left blank because the user forgets or is unable to assign an appropriate subject heading.

While email clients have become extremely advanced in sorting and managing emails, it is often unable to help users locate specific emails of interest. This is due in part to blank, vague, or misleading subject headings of emails. Many times users remember important emails by the subjects or topics covered in the email. To this end, users may scan subject headings to find the appropriate email. However, subject headings of emails often do not reflect the email content. This can result in forcing the user to review the email, which can be time prohibitive. Additionally, blank or common subject headings that have been flagged as junk email can cause email filters to block a legitimate email.

Further email conversations, can initially start with accurate headings but users may disregard updating the subject heading as the exchange continues. After several replies, email conversation subject headings can drift wherein they no longer correctly describe the email contents. This drifting can make it difficult to automatically and manually organize and prioritize emails. It would be greatly beneficial if subject headings accurately indicated the content of the email. A solution to aid in the appropriate labeling of email subject headings is needed.

SUMMARY OF THE INVENTION

The present invention discloses a solution for automatically generated subject recommendations for email messages based on email message content. The solution can comprise functions including, but not limited to, a recommend subject and verify subject functionality. In the solution, content of an email message can be automatically analyzed to determine one or more appropriate subject headers for an email message. The resulting analysis can present a user with a selection of appropriate subjects for a specific email. In one embodiment, a dialog box can be presented with a selection of recommended subjects for the email analyzed. The user can choose to select a recommended subject, wherein after user acceptance, the selected subject can become the subject header for the email.

In one embodiment, a user can manually invoke a recommend subject or verify subject function on a composed email message. Alternatively, the recommend or verify subject functionality can be automatically triggered by a user attempting to send a composed email. The recommend or verify subject functionality can employ a subject evaluation engine. The subject evaluation engine can perform an analysis of message content. Analysis can include use of keyword weighting, keyword frequency, context analysis, Topic Detection Technology (TDT), and the like.

The present invention can be implemented in accordance with numerous aspects consistent with the material presented herein. For example, one aspect of the present invention can include an email application that includes a subject evaluation engine, which is able to automatically generate a subject heading suggestion for an email message based upon content contained in the email message. The subject evaluation engine can also compare a pre-existing subject heading of the email message against content contained in the email message. User selectable interface elements can be included in the email application for invoking the suggestion and comparison functions of the subject evaluation engine. Further, the subject evaluation can automatically be initiated before an email message is sent, can be used to notify a user when the message's subject is inconsistent with the message content, and can suggest one or more replacement subject headings for the current heading.

Another aspect of the present invention can include a software implemented method. The method can detect a subject heading evaluation event for an email subject heading. The event can be triggered when an email send attempt is made. The event can also be triggered by a user selection of a GUI element, such as a verify email subject heading button. Once the event is triggered, content of an email message can be analyzed to determine a comparison score between the analyzed content and the email subject heading. A notification of the analysis results can be presented to a user. When the comparison score is sufficiently low, one or more suggested subject headings can be generated based upon message content and offered as a replacement subject heading for the pre-existing heading.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
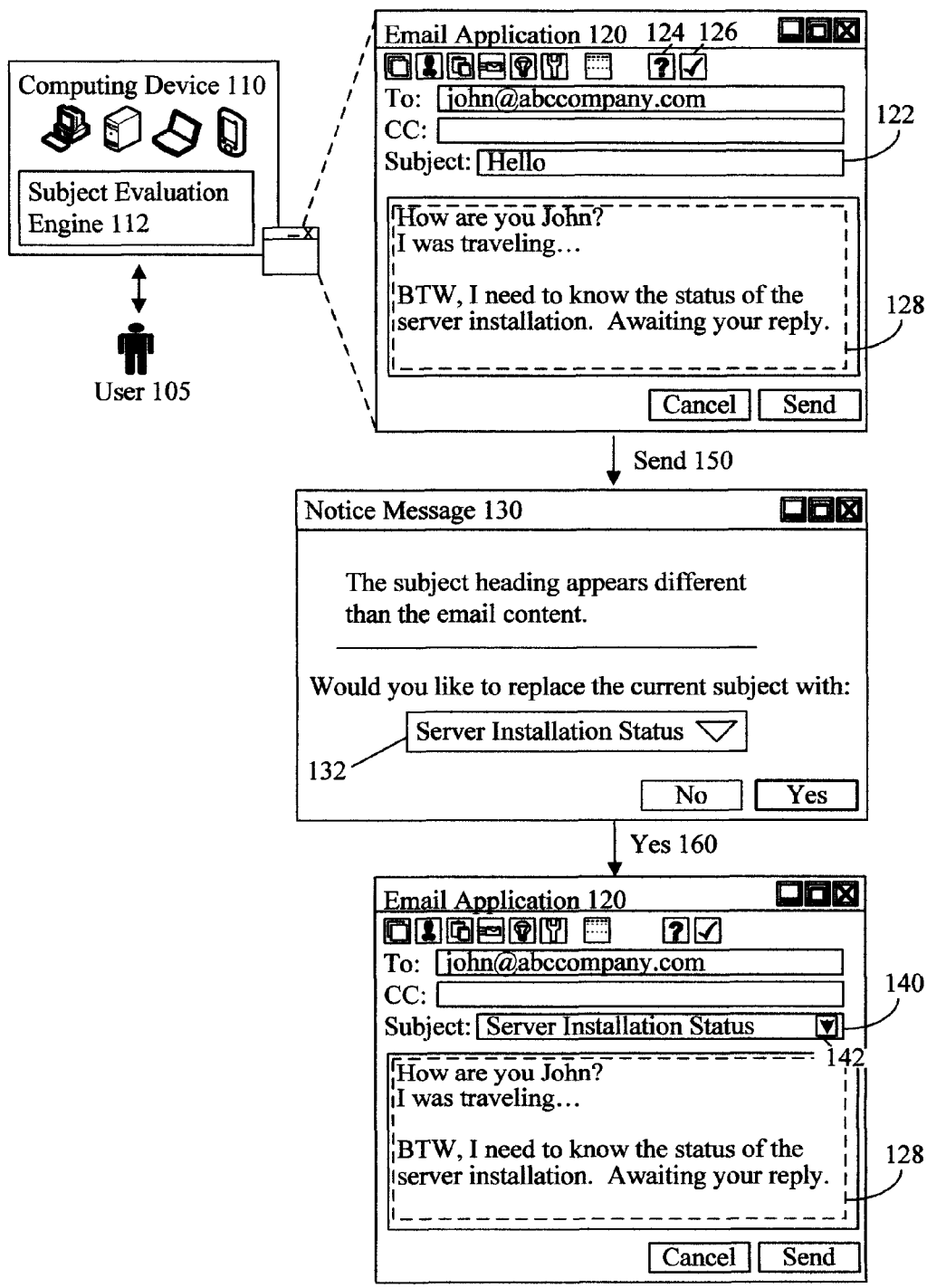
FIG. 1 is a schematic diagram of a system capable of subject recommendation for email messages based on email message content in accordance with the embodiment of inventive arrangements disclosed herein.

FIG. 1 is a schematic diagram of a system 100 capable of subject recommendation for email messages based on email message content in accordance with an embodiment of inventive arrangements disclosed herein. In system 100, a user 105 employing a computing device 110 to compose an email 128 can be assisted by a subject advisor functionality in an email application 120. A user 105 attempting to send 150 email message 128 can trigger the subject advisor functionality, which can validate the subject heading 122 suitability. Notice 130 comprising a list of recommended subject headings can be presented to a user 105 to aid in choosing an appropriate subject for email 128. User 105 can select and can use recommended subject 132. Approving the selected subject can invoke action Yes 160, which can result in the replacement of subject 122 with selected subject 140.

In email application 120, subject advisor functionality can be manually invoked by user 105 through suggest 124 and verify 126 graphical artifacts. Suggest 124 and verify 126 functions can invoke the execution of a subject evaluation engine 112. Subject evaluation engine 112 can be a software program capable of determining suitable subjects for a composed email 128. Further, subject evaluation engine 112 can be used to compare and validate user written subjects with automatically generated subject candidates. Subject candidates can be generated through analysis of composed email 128.

Subject evaluation engine 112 can be employed to analyze composed email 128. Analysis can include, but is not limited to, the use of keyword weighting, keyword frequency, context analysis, Topic Detection Technologies (TDT), BUZZ-TRACK, and the like. Analysis can include examination of previously composed sent and received emails in an email conversation. In one embodiment, email file attachments can be taken into consideration when analysis is performed by the subject evaluation engine 112. For example, a file attachment labeled "vacation photos" (not shown) can be used by the subject evaluation engine 112 in determining an appropriate subject heading.

As used above, BUZZTRACK refers to a technology to extract summarized content from email messages as described in Association for Computing Machinery (ACM) Publication No. 1-59593-481, 2/2007/0001, titled "Buzz Track: Topic Detection and Tracking in Email," by Roger Wattenhofer, Keno Albrecht, and Gabor Cselle. This publication is based on a Nov. 19, 2006 master's thesis "Organizing Email" by Gabor Cselle, which is currently available at http://www.gaborcselle.com/msthesis/gabor_cselle_organizing_email.pdf. Topic Detection and Tracking (TDT) refers to a set of technologies and sponsored program that advance the state of the art in technologies required to segment, detect, and track topical information in an information stream. For example, the National Institute of Standards and Technology (NIST) sponsored a 1998-2004 project to search, organize and structure multilingual, news oriented textual materials from a variety of broadcast news media. Organizing this news content by meaningful summaries using technologies from the TDT project can be applied to an email context to implement functions of the subject evaluation engine 112.

Regardless of the underlying technologies used by engine 112, assessment of email message 128 can result in a series of recommended subjects for the email as presented in a drop-down list in notice 130. Recommended subject 132 can be selected by user 105 as the preferred subject heading for email 128. In one embodiment, a ranking system can be used to indicate the validity of recommended subjects. This ranking system can help a user select from the list of suggested subjects. Additionally, a history of previously selected email subjects can be kept which can be used to train subject evaluation engine 112. For example, subject 140 can be used to adjust future recommended subject headings.

A selected subject 132 can replace an original subject 122, as shown in interface element 140. In one embodiment, an original subject heading 122 can be retained and remain accessible by a user. Thus, the subject heading 140 for an email message can actually be implemented as a set of stacked subject lines, where the stack includes original user entered subjects, as well as one or more replacement subjects generated by engine 112. A user can use a stack ordering tool 142 to choose whether original headings are displayed exclusively, whether final headings of conveyed email messages are displayed exclusively, whether one or more recommended headings are displayed (i.e., such as according to an associated relevancy score), or whether an entire stack of subject lines are to be displayed in a user established priority order. Use of stacked subject lines can be used when searching an email history for a desired message. Use of stacked subject lines ensures that users are not penalized when remembering an original email subject line instead of remembering a replacement subject heading generated by engine 112.

Computing device 110 can be a hardware/software entity capable of performing actions based on user interaction. Computing device 110 can include a desktop computer, laptop, mobile computing device, and the like. Computing device 110 can include the execution of software wherein a user can interact with local and remote applications.

An email application 120 can be a software program able to send and receive electronic mail. Email application 120 can include locally executing email clients such as THUNDERBIRD, EUDORA, OPERA MAIL, and the like. Additionally, Web-based email clients are contemplated. In one embodiment, subject evaluation engine 112 can be a Web-based service capable of serving requests from remote or local email clients.

The graphical user interface (GUI), GUI elements, and graphical artifacts presented herein are for illustrative purposes only and are not meant to limit the invention in any regard.

Figure 2:
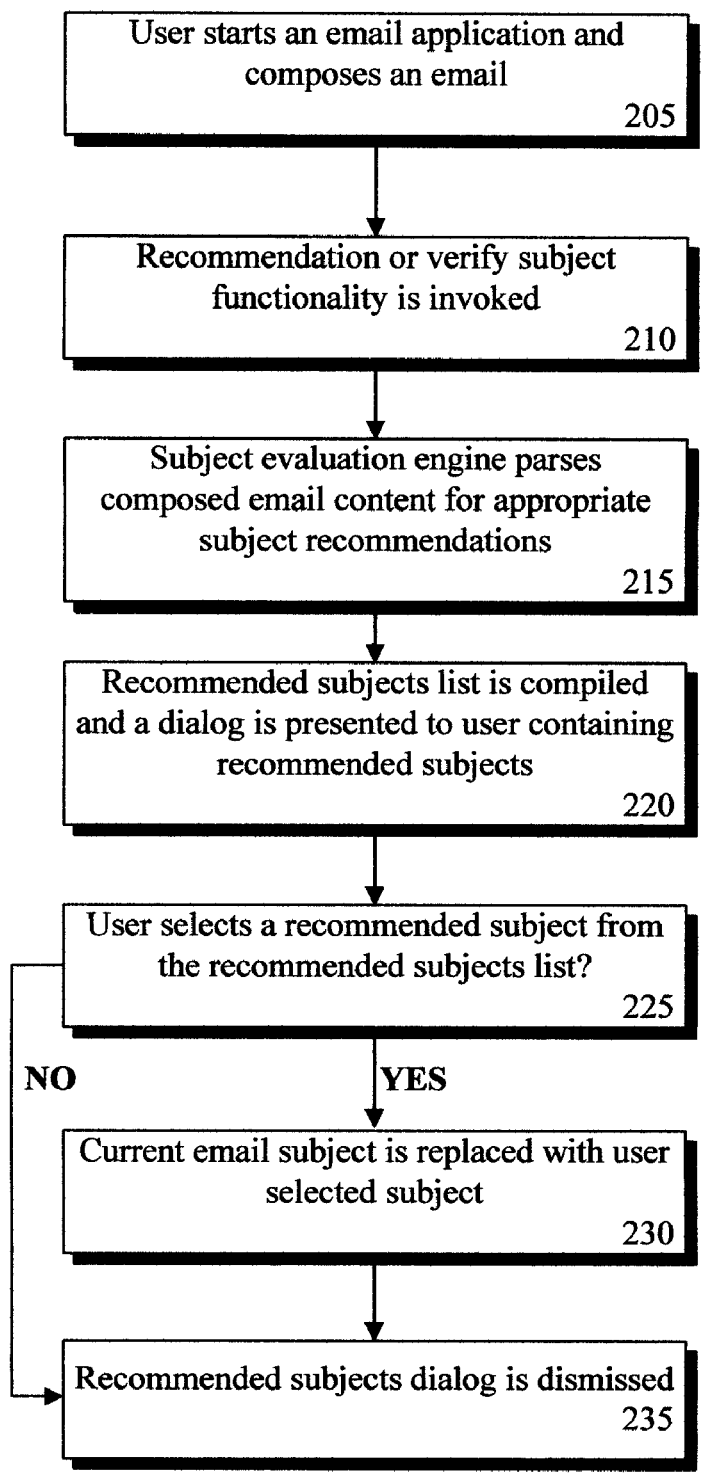
FIG. 2 is a flowchart illustrating a method for automatically generated subject recommendations for email messages based on email message content in accordance with the embodiment of inventive arrangements disclosed herein.

FIG. 2 is a flowchart illustrating a method 200 for automatically generated subject recommendations for email messages based on email message content in accordance with embodiment of inventive arrangements disclosed herein. In method 200, a user composing an email message can be presented with a selection of recommended subjects for an email message.

The method can begin in step 205 wherein a user can start an email application and can compose an email. In step 210, the recommendation or verify subject functionality can be invoked. The next step can be 215, wherein the subject evaluation engine parses the composed email content for appropriate subject recommendations. In step 220, a recommended subject list can be compiled and presented to the user containing recommended subjects. The user can select a recommended subject from the recommended subjects list as shown in step 225. If the user chooses not to select a subject, the method can proceed to step 235 wherein the presented recommended subject list can be dismissed. In the determining step 225, the current email subject of the composed email can be replaced with the user selected subject as shown in step

230. When stacked subject lines are implemented in method 200, an original subject heading can be retained within the subject line stack. The method can end in step 235 wherein the recommended subjects dialog is dismissed.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than foregoing the specification, as indicating the scope of the invention.

What is claimed is:

1. An email application implemented within a program stored in a memory, comprising:
    a subject evaluation engine implemented within a program stored the memory that automatically generates a subject heading suggestion for an email message based upon content contained in the email message,
    wherein the email message contains a pre-existing subject heading consisting of user input content,
    wherein the subject evaluation engine compares a pre-existing subject heading of the email message against content contained in the email message,
    wherein the subject evaluation engine is automatically invoked when a user attempts to send an email message and a notification message is automatically presented before the email message is sent only when a comparison score generated by the subject evaluation engine falls below a previously established threshold,
    wherein the subject evaluation engine generates the comparison score by comparing the pre-existing subject heading against the content, and
    wherein the notification message presents the user with a replacement option to replace the pre-existing subject heading with a subject heading suggestion generated by the subject evaluation engine.

2. The email application of claim 1, further comprising:
    a suggestion selector implemented within a program stored in the memory, which, when selected by a user, causes the subject evaluation engine to generate a subject heading suggestion, which is able to be accepted by a user, which when accepted the subject heading suggestion is used as a heading for the email message.

3. The email application of claim 2, wherein the subject evaluation engine maintains a history of user responses to subject heading suggestions, which is used to train the subject evaluation engine so that future suggested subject headings are adjusted in accordance with learned user preferences.

4. The email application of claim 1, further comprising:
    a subject verification selector implemented within a program stored in the memory, which, when selected by a user, causes the subject evaluation engine to compare the pre-existing subject heading against the content contained in the email message and present an indication of whether the pre-existing subject heading and the content are consistent.

5. The email application of claim 4, wherein the subject verification selector is a user selectable graphical user interface (GUI) button.

6. The email application of claim 1, wherein when the user selects the replacement option, the email message is sent having a subject heading that is the subject heading suggestion, and wherein when the user does not select the replacement option, the email message is sent having a subject heading that is the pre-existing subject heading.

7. The email application of claim 1, wherein the subject evaluation engine is a client-side software program used in conjunction with an email client program.

8. The email application of claim 1, wherein the subject evaluation engine is a server-side software program used in conjunction with an email server program.

9. The email application of claim 1, further comprising:
    a stacked subject line component implemented within a program stored in the memory, configured to maintain a plurality of different subject headings for a single email message.

10. The email application of claim 9, wherein one of the subject headings maintained for the email message comprises an original user entered subject heading, and wherein another of the subject headings maintained for the email message comprises a replacement subject heading generated by the subject evaluation engine, wherein said plurality of different subject headings are maintained within a non-volatile memory and available for post sending call up and searching via said email application.

11. The email application of claim 9, further comprising:
    an interface configuration option, implemented within a program stored in the memory, for the email application that permits a user to configure which of the plurality of different subject headings are to be displayed to a user of an email application interface.

12. A software implemented method, wherein said software is stored in a memory, said method comprising:
    detecting a subject heading evaluation event for an email subject heading, wherein the subject heading evaluation event is a user attempting to send an email message,
    generating, in response to the subject heading evaluation event, a comparison score based upon a comparison of the content of the email message against a pre-existing subject heading of the email message, wherein the pre-existing subject heading consists of user input content,
    generating, in response to generating the comparison score, a subject heading suggestion based upon the content of the email message,
    presenting a notification message to the user in a graphical user interface when the comparison score falls below a previously established threshold, wherein the notification message presents the user with a replacement option to replace the pre-existing subject heading with the subject heading suggestion.

13. The method of claim 12, further comprising:

when the user selects the replacement option, sending the email message having a subject heading that is the subject heading suggestion; and when the user does not select the replacement option, the email message is sent having a subject heading that is the pre-existing subject heading.

14. The method of claim 12, wherein the subject heading evaluation event is a user selection of a graphical user interface (GUI) option before the email message is sent, said method further comprising:

when the user selects the replacement option, replacing the pre-existing subject heading of the email message with the subject heading suggestion.

* * * * *